Patented Apr. 27, 1937

2,078,428

UNITED STATES PATENT OFFICE 2,078,428

PROCESS OF OBTAINING PHOSPHATIDES FROM SOAPSTOCK

Benjamin H. Thurman, Yonkers, N. Y., assignor to Refining, Inc., Reno, Nev., a corporation of Nevada No Drawing. Original application September 6, 1933, Serial No. 688,361. Divided and this application February 12, 1935, Serial No. 6,260

3 Claims. (Cl. 260—99.20)

This invention relates to the recovery of phosphatides from soapstock that is obtained in the purification of cotton seed oil. This soapstock is customarily obtained by treating the cotton seed oil with caustic alkalies or alkaline carbonates or phosphates or other reagents that will saponify the free fatty acids in the oil and then separating the soapstock from the oil. This is a division of my application, Serial No. 688,361, filed September 6, 1933.

It has been found that the soapstock obtained from cotton seed oil in the usual way contains up to as high as about 10% of phosphatides. These phosphatides have heretofore been regarded as deleterious impurities in the soap stock.

By the present invention the phosphatides are removed in large measure or substantially entirely from cotton seed oil soapstock in such a way that they do not contain an appreciable or seriously objectionable amount of injurious impurities or discoloring materials.

In carrying out the invention the cotton seed oil soapstock is treated with a solvent for the soapstock. Acetone, for example, may be used for this purpose as it will dissolve and remove the soap, free oil and water leaving the phosphatides as a residue when the solution is filtered or centrifuged. Other soap solvents, such as methyl acetate, for example, in which the phosphatides are insoluble or difficultly soluble, may be used instead of acetone for this purpose.

The following are given as specific examples of carrying out the invention, but it is to be understood that these examples are not exhaustive and that the invention is not restricted to any particular solvent or proportion mentioned or to the temperature or time specified.

*Example 1.*—About one part by volume of cotton seed oil soapstock was agitated with five parts of acetone for a few minutes at room temperature and the mixture was filtered. The solids left on the filter were for the most part phosphatides and amounted to about 10% of the weight of the soap stock.

*Example 2.*—The same amount of methyl acetate was used as the amount of acetone in Example 1 and substantially the same result was obtained.

After the phosphatides have been separated from the soapstock, as described above, they should be purified to remove extraneous or deleterious matter, leaving a purified residue that is very valuable in the arts for many useful purposes. The solid content of the mass containing phosphatides that is obtained from the soap stock contains about 60 or 70% of the valuable phosphatides from which a large portion or substantially all of the remaining solids or deleterious matter can be removed. The remaining purified phosphatides are of such a character that they do not have an objectionable taste or odor and do not become rancid for a long time even when exposed to air, or certain ingredients which appear to aid in preserving the phosphatides may have been removed from the soap stock with the phosphatides and are not removed from the phosphatides during the purification step. The deleterious impurities may be removed from the phosphatide mass or residue by washing the phosphatides or solids with water, or an aqueous sodium chloride solution may be used instead of water for washing the phosphatides. About 10% of sodium chloride in the water has been found to be satisfactory. An aqueous salt solution apparently has a solvent action on some of the globulin and albuminoid substances in the phosphatide mass so that they are removed during the washing step. Also, the remaining insoluble phosphatides are left in small particles. The phosphatides may be washed repeatedly with water containing salt. The phosphatides or remaining product may be dried. The drying is preferably done in a vacuum with a temperature not exceeding 70° C. When the phosphatides have been obtained by means of solvents for the phosphatides and evaporating the solvents, the dried product may be washed with acetone to remove acetone soluble materials, such as fatty acids, coloring materials and small amounts of other undesirable substances. The acetone may be distilled off while the air is excluded from the product. The purified dried material is yellow and in the form of a powder.

It has also been found that water can be used for washing the phosphatides without having salt dissolved in it, provided the pH of the water is kept sufficiently low, say about pH 3 to prevent emulsification. Chlorine ions appear to be particularly advantageous in preventing emulsification, although other acids and acid salts, such as tartaric, citric, sulphuric acids and sodium salts and sodium acid salts, for example, which will lower the pH of the solution can be used. However, hydrochloric acid has thus far been found to be the most satisfactory for this purpose.

The purified dry product may be dissolved in a non-solidifying oil, such as sunflower oil, sesame oil, or soya bean oil and the substances that are insoluble in these oils may be centrifuged or filtered out. The percentage of oils used for dissolving the product may be 40% or more of the weight of the product that is dissolved in the oil.

Some of the characteristics which distinguish the phosphatides or product obtained, as described above, from cotton seed oil, from similar products are as follows:

(a) This product contains approximately the same percentage of phosphorous, namely about 1.8%, calculated on a dry basis, as the precipitate that precipitates out of the oil after it has been allowed to stand for a long time without the addition of a reagent.

(b) The iodine number of the purified product is approximately 60, while the iodine number of the purest vegetable lecithin products now known is about 90.

(c) Fatty acids obtained from this purified product or phosphatides have an iodine number of about 95 while the iodine number of cotton seed oil is about 108 and the iodine number of soya bean oil, as well as the fatty acids from lecithin obtained therefrom, is about 125. The low iodine number of the product of this invention and the fatty acids obtained from it probably explains, at least in part, why the product of this application will keep such a long time or has very little tendency to absorb air and become rancid.

(d) The product or phosphatides of this invention may be dissolved in high boiling oils, such as sunflower seed oil and heated to 440° F. without changing color very much and without having a very noticeable amount of objectionable odor or taste imparted thereto, while lecithin obtained from soya beans and heated in the same way has imparted to it a very dark or almost black color and a very nauseating odor and unpalatable taste, resembling the odor of fish or paint.

(e) A trace of gossypol or raffinose has been found in the phosphatides, but is not present in sufficient amounts to interfere with the edibleness of the phosphatides.

The purified phosphatides obtained from cotton seed oil as described above are useful for many purposes, some of which may be mentioned; as an agent for reducing the viscosity of sugar, chocolate and fat coatings; a small amount, say 0.3% thereof, added to chocolate prevents the same from blooming after several hours even in warm weather; about one-half of 1% thereof added to vegetable oils greatly decreases the tendency of these oils to become rancid even at temperatures up to 150° F. or higher over an extended period of time; about 1% or less thereof added to dressings, such as mayonnaise, materially increases the keeping qualities of the same and prevents or greatly retards rancidity; less than 1% thereof added to margarine prevents the same from foaming or spattering when heated, thus permitting food, such as eggs, to be browned when fried therein; less than 1% added to deep frying oils or fats prevents or greatly retards rancidity and acquisition of bad flavors or odors even at temperatures somewhat above 400° F.; a small amount thereof added to fats used in making caramels improves the quality of the caramels without imparting any objectionable taste.

It has been found that mayonnaise containing soya bean oil which would become rancid and develop a characteristic odor in a few days will remain fresh when about $0.\tfrac{2}{10}$ths percent of the product or phosphatides of this invention is added. This product seems to act as an anti-oxidant or at least prevents development of the objectionable odor or flavor in the soya bean oil. This may possibly be due to the prevention of the action of enzymes or bacteria in the soya bean oil used in making mayonnaise dressing. When about 0.1% of this product is added to butter it prevents formation of strong odors even when the butter is exposed to the atmosphere for a long time and it also prevents water from leaking out of the butter, probably because it is a good emulsifying agent for the butter. This product is also valuable as an apparent anti-oxidant in the manufacture of rubber, as well as an excellent anti-oxidant when put in linseed oil varnish that is to be used for painting rubber goods. The addition of even less than 1% of the product to fats or oils that are used for frying vegetable products greatly reduces the tendency of these fats or oils to split and form products that are characteristic of overheated fats, thus imparting substances to the food products that would cause them to become rancid. Food products, such as potato chips that have large surfaces are especially prone to become rancid very rapidly by oxidation. The use of the product of this invention in fats or oils for frying such vegetables protects the products and permits the same fatty oil to be used repeatedly for frying them.

I claim:

1. The process of recovering phosphatides, which comprises treating cotton seed oil soapstock with a soap and oil solvent, separating the insoluble products, and washing them with an aqueous solution having a pH of not more than about 3.

2. The process of recovering phosphatides, which comprises treating cotton seed oil soapstock with a soap and oil solvent, separating the insoluble products, and washing them with an aqueous solution containing chlorine ions and having a pH of not more than about 3.

3. The process of recovering phosphatides, which comprises treating cotton seed oil soapstock with a soap and oil solvent in which phosphatides are substantially insoluble, separating the insoluble products and washing them with an aqueous solution having a pH of not more than about 3.

BENJAMIN H. THURMAN.